United States Patent [19]

MacKenzie

[11] Patent Number: 5,862,199
[45] Date of Patent: Jan. 19, 1999

[54] METHOD AND APPARATUS FOR MEASURING THICKNESS OF PAINT LAYERS ON SUBSTRATES USING BACKSCATTERING OF X-RAYS

[75] Inventor: Innes K. MacKenzie, Guelph, Canada

[73] Assignee: University of Guelph, Ontario, Canada

[21] Appl. No.: 902,125

[22] Filed: Jul. 29, 1997

Related U.S. Application Data

[63] Continuation-in-part of Ser. No. 521,020, Aug. 30, 1995, abandoned.

[51] Int. Cl.$^6$ ..................................................... G01B 15/02
[52] U.S. Cl. ................................................. 378/89; 378/86
[58] Field of Search .................................................. 378/89

[56] References Cited

U.S. PATENT DOCUMENTS 3,854,042  12/1974  Ott ............................................ 378/89

FOREIGN PATENT DOCUMENTS 58135407  8/1983  Japan .

Primary Examiner—Craig E. Church
Attorney, Agent, or Firm—Lynn C. Schumacher; Nancy E. Hill; Hill & Schumacher

[57] ABSTRACT

The present invention provides a method and apparatus for nondestructive, in situ measuring thicknesses of layers on substrates. The method and device uses a probe including a radioactive source in a source holder and a photodetector mounted behind the source for detection of backscattered photons. In one aspect the method is used to measure the thickness of paint deposited onto metal substrates. The source holder and photodetector array forms a cylindrically symmetric probe for producing an axially symmetric beam of primary photons. A source containing radioactive $^{109}$Cd producing high energy photons of energy 22 and 25 keV is spaced from the painted surface so the photons impinge on the painted substrate. The intensity of photons backscattered by Compton scattering in the paint layer is proportional to the mass density of the paint to give a direct measurement of the paint thickness. The photons penetrating through to the substrate are absorbed within the substrate.

19 Claims, 8 Drawing Sheets

METHOD AND APPARATUS FOR MEASURING THICKNESS OF PAINT LAYERS ON SUBSTRATES USING BACKSCATTERING OF X-RAYS

CROSS REFERENCE TO RELATED U.S. PATENT APPLICATION

This patent application is a continuation-in-part application of U.S. patent application Ser. No. 08/521,020 filed on Aug. 30, 1995 entitled METHOD AND APPARATUS FOR MEASURING THICKNESS OF LAYERS ON SUBSTRATES USING BACKSCATTERING OF HIGH ENERGY PHOTONS, now abandoned.

FIELD OF THE INVENTION

The present invention relates to an in situ and non-destructive method and device for measuring the thickness of coatings comprising low-Z components, and more particularly the present invention relates to a method and device for measuring thickness of paint layers on substrates using backscattering of x-rays.

BACKGROUND OF THE INVENTION

The ability to measure, nondestructively and *in situ* the thickness of growing thin films is very advantageous in many industrial applications. For example, it is important to be able to monitor the thickness of paint being sprayed on cars, trucks or aircraft during production. The costs associated with painting vehicles, particularly in assembly line production is quite significant so that applying too thick a paint layer has serious economic repercussions. Alternatively, if there is too thin a paint layer this may result in the vehicle having to be repainted.

Post production painting of vehicles usually involves applying three distinct layers comprising a primer coating or layer applied directly to the metal substrate, a base coating containing the pigment applied on top of the primer coating and a clear coating applied on top of the base coating. The total thickness of these layers is about 0.05 mm to 0.10 mm with about half of the total thickness being due to the top clear coat. It is preferable that each layer of uniform thickness and manufacturers are particularly concerned about controlling the thickness of the base coat; however the base coat is the thinnest layer (about 0.01 mm) which makes it very difficult to control its thickness.

There are several known ways of estimating the average thickness of the paint layers. One is to simply weigh the paint used to cover a certain area and, knowing the mean density of the paint, calculate the average thickness which is generally expressed in units of $mg/cm^2$, known as the "areal density." Disadvantages of this and similar techniques is it is not an in situ technique, it is very labour intensive and does not give any information about the uniformity of the layers.

Another method and device for measuring paint thickness is disclosed in EP-A-0 380 226. This method relies upon irradiating a coating with x-rays and measuring fluorescent x-rays and Compton peaks from the spectrum of scattered x-rays. There are several drawbacks to the method and device. The device relies upon use of an expensive LO-AX hyperpure germanium detector. The method only works by adding a non-radioactive label (that fluoresces upon activation by x-rays or gamma rays) of atomic number greater than 20 and the label must be compatible with the radiation source due to correlation between fluorescence efficiency and energy of the x-rays. The method involves measuring the ratio of fluorescent x-rays and Compton rays and the ratio of Compton and Rayleigh yields. The fact that this method of measuring paint thickness is dependent upon adding a label is a major drawback since compatibility of the paint and label material must be taken into account. In addition, it is not practicable or economic to add labels to paints in large scale paint applications such as in painting of automobiles. In order to measure paint thickness with useful precision by using the fluorescent x-rays of additives, it is necessary to add several parts per thousand of label material. Such concentration is difficult to maintain as a homogeneous mixture and it can also degrade the weather resistance of the paint. Therefore it would be very advantageous to provide a method of measuring paint thickness which avoids the need for adding labels to the paint.

At present there is no single, reliable, economic method for accurate, in-situ and nondestructive monitoring of paint thickness as it is being applied to substrates. X-ray backscattering is one method which shows promise as a technique for estimating film thicknesses; however, this technique has severe limitations. A simplified model used in considering backscattering of x-rays from a paint layer on a metal backing is based on two assumptions: 1) the x-rays interact with the paint layer only by the mechanism of Compton scattering and because the total Compton scattering cross-section is almost exactly proportional to the mass, the backscattered x-ray intensity should be proportional to the mass/unit area of the paint layer over range a broad of x-ray energies; and 2) that x-rays penetrating through to the steel backing or substrate are fully attenuated or absorbed in the substrate and not back scattered.

The assumption that the intensity of the backscattered x-rays from the paint is almost exactly proportional to the paint thickness over a broad range of x-ray energies usually holds because the paint layer is so thin and comprised of elements of low atomic number. The model breaks down generally because of the assumption that the metal panel is a perfect absorber over the same range of energies. This will be more fully discussed below but this drawback has severely limited the application of x-ray backscattering as a viable in situ technique because the backscattered intensity from the substrate exceeds that from the paint by a large factor unless special precautions are observed.

SUMMARY OF THE INVENTION

The present invention provides a non-destructive, in-situ method of measuring thickness of layers comprising elements with low atomic numbers coated on a substrate during or after deposition on the substrate.

The present invention provides a method for measuring thickness of a coating comprising elements of low atomic numbers such as, but not limited to paint on a surface of a metal substrate such as aluminum, titanium, iron, galvanized iron, copper, alloys thereof and equivalents thereof such as metals and alloys falling on the albedo plot in FIG. 3 between Al and Ge. The method comprises the steps of providing an x-ray source in a source holder, the x-ray source producing primary photons having energies in the range from about 14 keV to about 25 keV sufficiently high to provide sufficient enhancement of Compton scattering from the paint coating over Compton and Rayleigh scattering from the substrate but low enough to provide sufficient contrast between photoelectric absorption in the paint coating and the metal substrate. The method includes positioning the source holder in opposing relation to the surface of the paint-coated substrate and measuring a total intensity of backscattered secondary photons from the paint-coated metal substrate and thereafter determining the thickness of the paint coating from the total intensity of backscattered photons.

In this aspect of the invention the step of providing a radioactive source in a source holder includes providing a cylindrically symmetric source holder to provide an axially symmetric beam of primary photons emerging from the source holder. The x-ray source is a radioactive source and may be selected from the group consisting of $^{57}$Co, $^{241}$Am, $^{109}$Cd, and $^{244}$Cm sources.

The present invention also provides a method for controlled application of paint to a surface of a metal substrate such as aluminum and its alloys, titanium and its alloys, iron and iron alloys including galvanized iron, copper and its alloys, and equivalents thereof. The method comprises the steps of providing an x-ray source in a source holder, the x-ray source being selected to produce primary photons having energies in the range from about 14 keV to about 25 keV sufficiently high to provide sufficient enhancement of Compton scattering from the paint coating over Compton and Rayleigh scattering from the substrate but low enough to provide sufficient contrast between photoelectric absorption in the paint coating and the metal substrate. The method includes applying paint to the surface and positioning the holder in opposing relation to the surface of the metal substrate being painted and measuring a total intensity of backscattered secondary photons from the paint coated metal substrate and processing the intensity of backscattered secondary photons and calculating therefrom a thickness of the paint coating which is compared to a preselected paint thickness and if the thickness of the paint coating is less than the preselected paint thickness then the painting process is continued. If the paint thickness equals or exceeds the desired thickness then the painting is terminated.

The present invention also provides an apparatus for controlling application of a paint coating to a metal surface of a vehicle. The apparatus comprises a plurality of probes mounted on a frame, each probe including an x-ray source located in a source holder and a photodetection means located behind each source holder for measuring an intensity of backscattered photons. The x-ray source produces primary photons having energies in the range from about 14 keV to about 25 keV, high enough to provide sufficient enhancement of Compton scattering from the paint coating over Compton and Rayleigh scattering from the metal substrate but low enough to provide sufficient contrast between photoelectric absorption in the paint coating and the metal substrate. The apparatus includes a painting device for dispensing paint and computer control means connected to the painting device and the probes wherein each probe forms a feedback element for computer control of the amount of paint discharged by the painting device.

In this aspect of the invention the source holder may be a cylindrically symmetric source holder mounted in front of the photodetection means to provide an axially symmetric beam of primary photons emerging from said source holder away from the photodetection means. The x-ray source is a radioactive source and may be selected from the group consisting of $^{57}$Co, $^{241}$Am, $^{109}$Cd and $^{244}$Cm sources. The photodetection means may be a NaI(Tl) Xray scintillator coupled with a photomultiplier detector.

BRIEF DESCRIPTION OF THE DRAWINGS

The method of measuring paint thickness according to the present invention will now be described, by way of example only, reference being had to the accompanying drawings, in which.

DETAILED DESCRIPTION OF THE INVENTION

Figure 1:
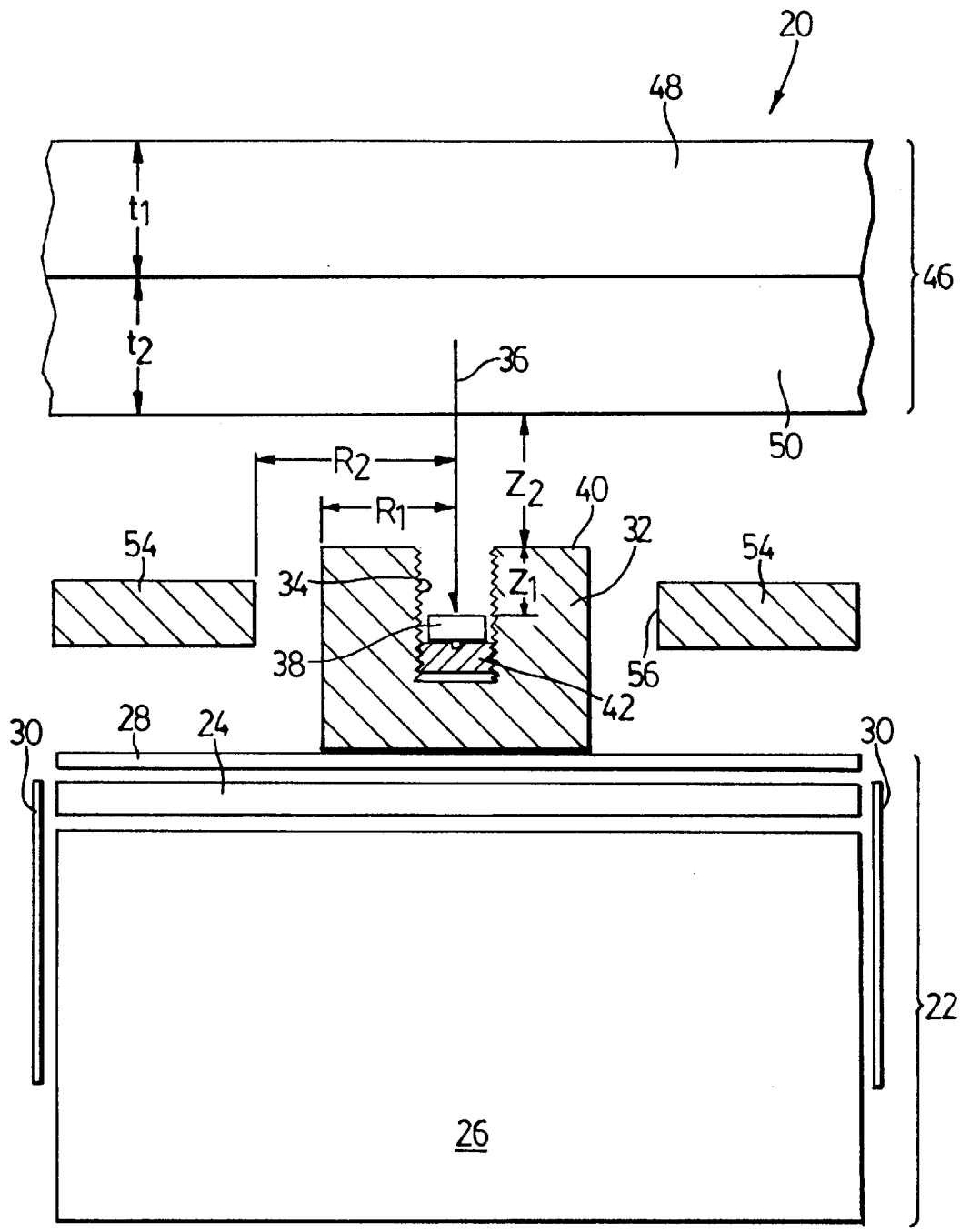
FIG. 1 is a longitudinal section of a radioactive source, holder and detector for measuring thicknesses of layers on substrates according to the present invention.

The basic design and geometric arrangement of an axially or cylindrically symmetric detector-source geometry constructed in accordance with an aspect of the present invention will be discussed first followed by descriptions of preferred embodiments for measurement of paint thickness or other coatings comprising low-Z components on metal substrates. The preferred embodiments of this invention illustrated in the drawings are not intended to be exhaustive or to limit the invention to the precise form disclosed so that the applications cited are exemplary in nature and are not intended to limit the scope of the invention. The particular applications disclosed herein are chosen to describe the principles of the invention and its applicable and practical use to thereby enable others skilled in the art to best utilize the invention.

Referring to FIG. 1, a longitudinal section of a cylindrically symmetric detector-source-target arrangement constructed in accordance with the present invention is shown at 20. A scintillation detector 22 includes a thin (1.0 mm) NaI(Tl) scintillator 24 housed in an aluminum cylinder (not shown) of 5.08 cm external diameter and 15.24 cm in length which also houses a photomultiplier 26. A protective covering 28 such as MYLAR extends across the scintillator. A lead shielding 30 is provided around the sides of detector 22 to minimize multiple scattering from nearby objects.

A source holder 32 is provided with a longitudinal cavity 34 extending partly therethrough for holding a radioactive source 38. Holder 32 is shown as being tubular with a radius $R_1$ and cavity 34 defines a detector axis 36. Holder 32, also referred to as an absorber post, is fabricated of a sufficiently thick and dense material so that primary radiation from source 38 is blocked or absorbed before hitting detector 22 below the source.

Radioactive source 38 is preferably a commercially available sealed source of x-rays or γ-rays typically 3.0 mm in length and diameter. Source 38 sits on a threaded stud 42 which can move up and down in cavity 34. Source 38 sits at an adjustable depth Z below the top surface 40 of holder 32. The cylindrically symmetric geometry and structure of holder 32 are such that with a source 38 in the holder, the axially symmetric beam of primary radiation moves upwards in a cone whose half angle is adjustable by the depth Z. The area of a target 46 (shown as two contiguous layers 48 and 50) spaced a distance $Z_2$ from surface 40 irradiated by the source is determined by both the half angle and the spacing $Z_2$.

The diameter of source holder 32 may vary from about 5 mm to about 22 mm and the holder may be fabricated of gold or other suitable high density material depending on the application. For example, platinum, tungsten, silver, molybdenum, lead and tantalum may all be used as materials for the source holder. The detector assembly may optionally include an iris 54 defining an aperture 56 and having an inner radius $R_2$ symmetrically disposed with respect to source holder 32. Iris 54 is formed of a material which acts to absorb x-rays and y-rays. Target 46 is located with respect to the source 38 and detector 22 array so that it intercepts the cone of primary photons emanating from the source which may interact with the target in several ways to produce a variety of secondary radiation. The backscattered photons can reach detector 22 only by passing through the annulus defined by radius R of the source holder and $R_2$ of iris 54 symmetrically disposed about the axis 36 (FIG. 1). Holder 32 blocks primary radiation from the source impinging on the detector. Iris 54 is optional.

The variables of the detector-source-target system include the dimensions $R_1$, $R_2$, $Z_1$, $Z_2$, the presence or absence of iris 54 and the choice of radioactive source 38. There are in principle several radioactive sources which may be used with the choice of radioactive source being dependent on the specific application. The preferred radioactive sources used in the present invention include $^{241}$Am and $^{109}$Cd, $^{57}$Co and $^{244}$Cm. Further details of the detector-source configuration are found in Innes K. MacKenzie, An Axially Symmetric Gamma-Ray Backscatter System For Dumond Spectrometry, Nuclear Instruments and Methods in Physics Research A299 (1990) 377–381.

B) MEASUREMENT OF PAINT THICKNESS ON SUBSTRATES USING X-RAY BACKSCATTERING

A drawback to previous attempts to use x-ray backscattering for measuring paint thickness on for example vehicles on an assembly line using the soft 6 kiloelectron volts (keV) x-rays from $^{55}$Fe was strong absorption of the x-rays in the air gap between the probe and the paint layer. Sway of vehicles on an assembly line is unavoidable and so a minimum air gap of about 2.5 cm preferably exists between the probe and the surface being painted to avoid physical contact between the probe and panel being painted.

A more fundamental limitation of x-ray backscattering using low energy x-rays relates to the fact that typically Rayleigh scattering from the metal substrate has been assumed negligible and therefore ignored when interpreting the data. The inventor however has determined that Rayleigh scattering contributes significantly to the backscattered intensity when using soft x-ray photons of energy 6 keV produced by $^{55}$Fe. As discussed above, the simplest model used in considering backscattering of x-rays from a paint layer on a metal backing is based on the assumption that the x-rays are reflected by the paint layer only and x-rays penetrating through to the steel backing or substrate are fully attenuated or absorbed and not backscattered. In this model the x-rays interact with the paint layer only by the mechanism of Compton backscattering.

While the assumption that the intensity of backscattered x-rays from the paint is almost exactly proportional to the paint thickness over a broad range of x-ray energies is valid, the model breaks down with the assumption that the metal backing is a perfect absorber. Using steel as an example, it is always true that absorption has to compete with scattering in the steel. A good approximation to Compton scattering per atom is that it is proportional to the atomic number Z whereas photoelectric absorption is proportional to $Z^5$ so the ratio is approximately proportional to $Z^4$. Hence steel (iron) is a vastly better absorber than paint which comprises primarily carbon, hydrogen and other low-Z elements.

However, there is another important consideration. That is that the photoelectric absorption cross section varies roughly as the inverse 7/2 power of the x-ray energy. To illustrate the importance of this, consider the mass attenuation coefficients as a function of x-ray energy for copper given in Table I. Table I compares x-ray mass attenuation coefficients as a function of x-ray energies for several metals. At x-ray energies above 14 keV the mass attenuation coefficient varies fairly slowly with energy. That is because attenuation due to the photoelectric effect is weak in this regime and much of the attenuation is caused by the slowly varying Compton effect. At energies from about 8.95 to 13 keV the changes are very rapid and this corresponds to the region where photoelectric absorption dominates. At about 6 keV the attenuation in copper is about 23 times as great as at 34.92 keV. A similar situation applies to iron (not shown) so that, when considering only photoelectric absorption and Compton scattering one is led to the conclusion that in order to achieve the ideal of high absorption in the metal substrate very low x-ray energies are required.

This prior art model ignores the effect of Rayleigh scattering which in certain energy ranges may effectively compete or dominate photoelectric absorption and/or Compton scattering. At low energies such as 6 keV poor contrast between paint and steel is obtained due to the backscattered intensity being dominated by Rayleigh scattering instead of the expected Compton scattering.

Figure 2A:
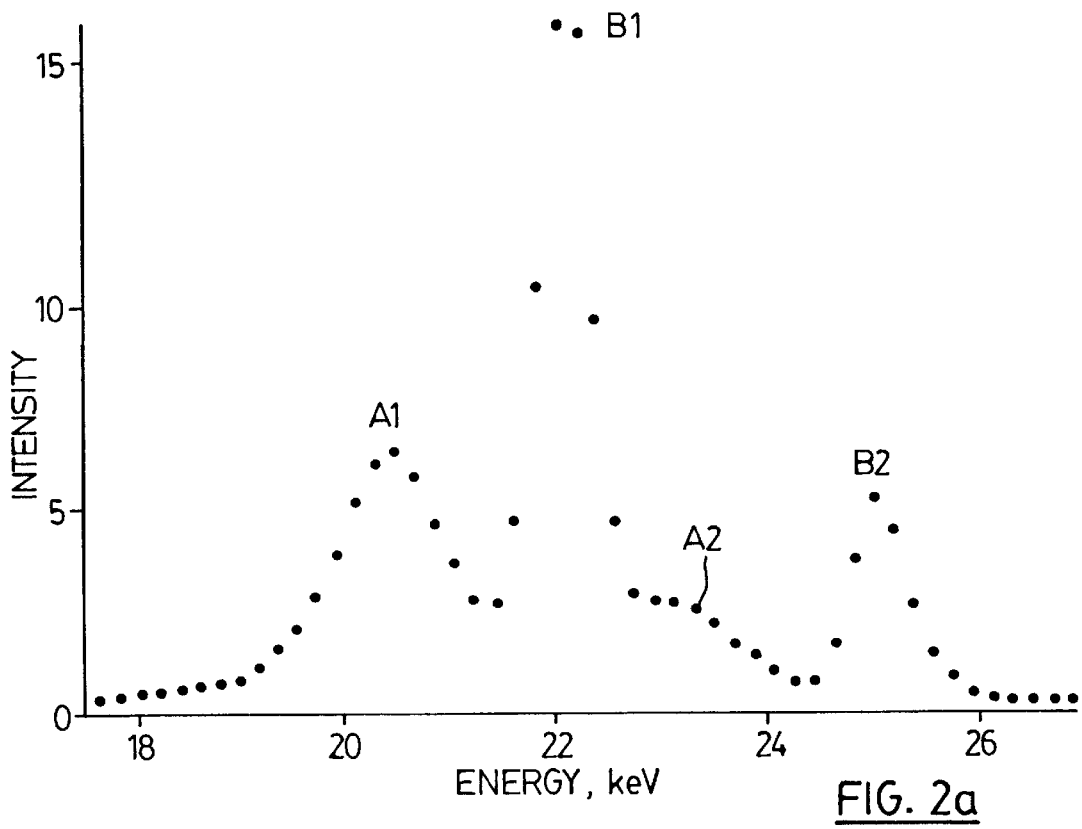
FIG. 2a illustrates the backscattered x-ray energy spectra for the K-shell x-rays of silver from a copper target.
Figure 2B:
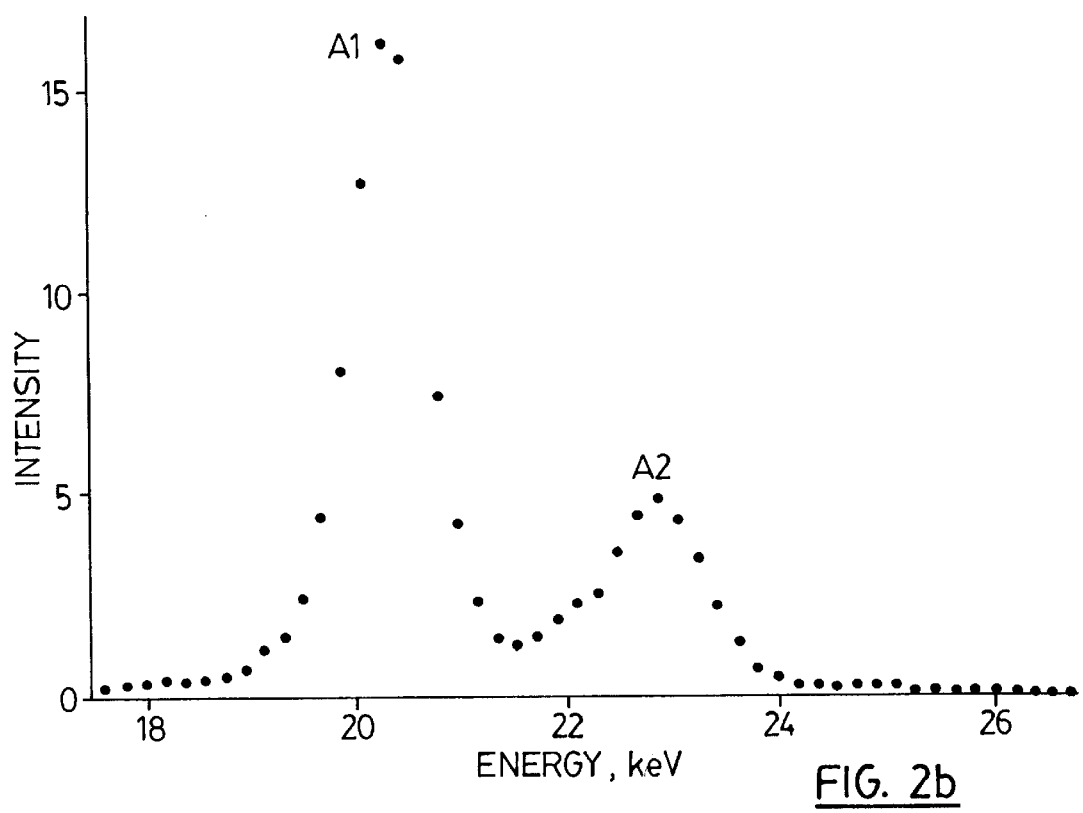
FIG. 2b illustrates the backscattered x-ray energy spectra for the K-shell x-rays of silver from low density polyethylene.

The backscattered energy spectra for the K x-rays of Ag (22 and 25 keV) incident on copper are shown in FIG. 2(a), and for polyethylene in FIG. 2(b). The intensity vs. energy spectra for polyethylene $(CH_2)_n$, shows only two peaks A1 and A2 for polyethylene which are due to Compton scattering proving that it is an almost ideal Compton scatterer at 22 and 25 kev. When the same measurement is made on copper there are two additional Rayleigh peaks B1 and B2 that are more intense than the Compton peaks A1 and A2.

The dominance of Rayleigh scattering increases rapidly at lower x-ray energies. Therefore, for a paint film on a steel metal substrate and using an $^{55}$Fe source of x-rays of energy of approximately 6 keV, Compton scattering from the steel will be considered insignificant compared to Rayleigh scattering from the steel and so the contributions to the backscattered x-ray intensity are Compton scattering from the paint and Rayleigh scattering from the steel. Therefore the contrast between the backscattering from the steel substrate and the paint is destroyed and most of the intensity of the backscattered photons comes from the steel even with very thick paint layers so that low energy soft x-rays cannot be used reliably to measure paint thickness on steel substrates.

The method of the present invention is based on the fact that in order to measure the thickness of materials of low atomic numbers coated on substrates with high atomic numbers, one must use high energy photons in the appropriate energy range such that Compton scattering from the layers comprised substantially of elements of low atomic number Z competes successfully with the total of Compton and Rayleigh scattering from the substrate with high atomic number. The choice of options is very limited because there are few radioactive sources having a reasonable half-life that produce primary photons of suitable energy.

Figure 3:
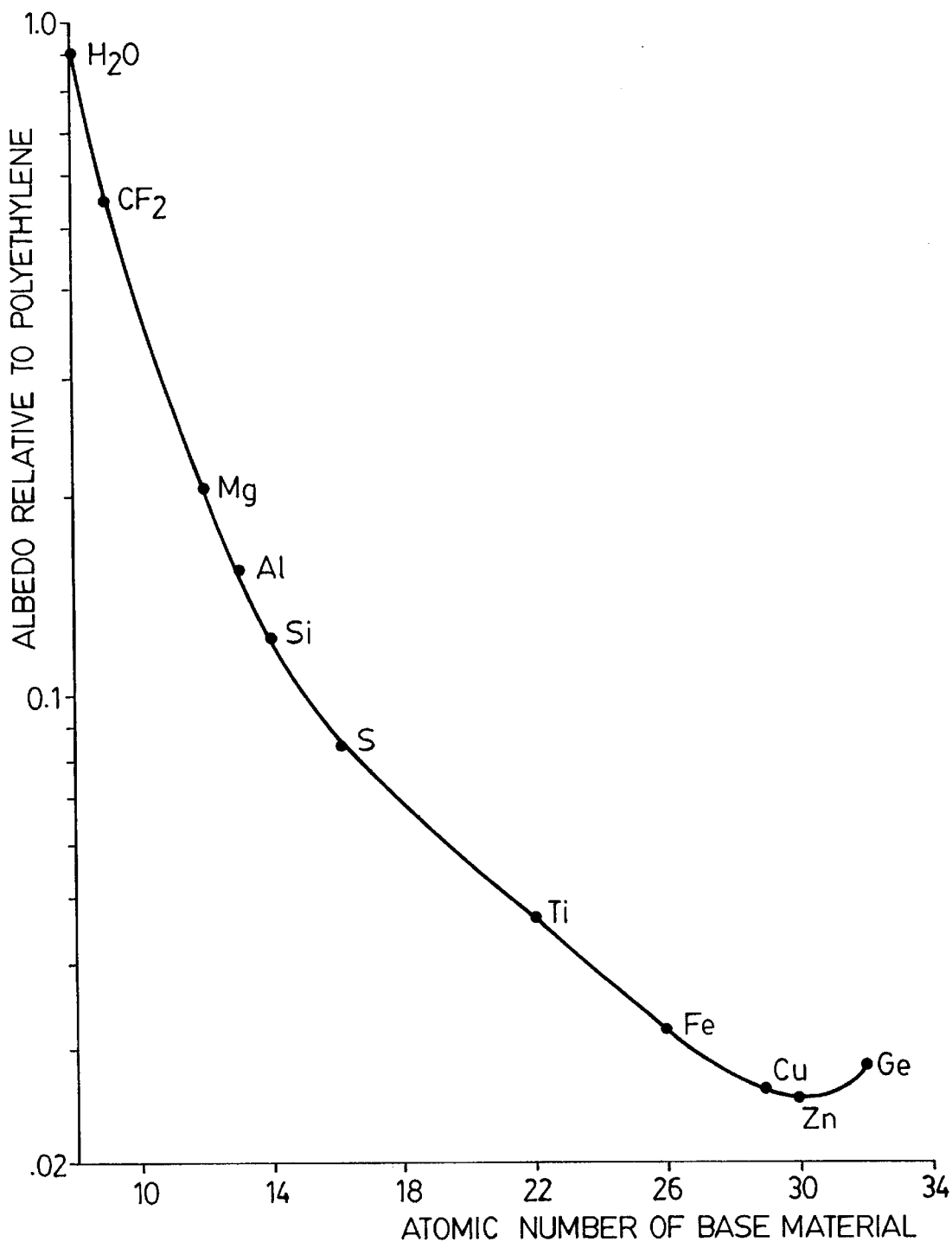
FIG. 3 shows the ratio of the reflection of silver K-shell x-rays from thick specimens of various materials to that from a thick block of low density polyethylene.

The influence of the underlying substrate material is best understood with reference to FIG. 3 which shows the ratio of the reflection of silver K x-rays (22 and 25 keV) from very thick specimens of various materials to that from a thick block of low-density polyethylene. Hereinafter this relative reflectivity ratio is referred to as the albedo (whiteness). Paint is a low-Z mixture with an albedo close to 1.0. An ideal backing material would exhibit an albedo of zero but it is clear that this ideal is unattainable. The lowest albedo value for the K x-rays of silver, about 0.025 is obtained using a zinc substrate; i.e. zinc reflects about 1140th as much as polyethylene. Iron exhibits an albedo only slightly higher than zinc but the difference is significant as will be further discussed below.

Figure 4:
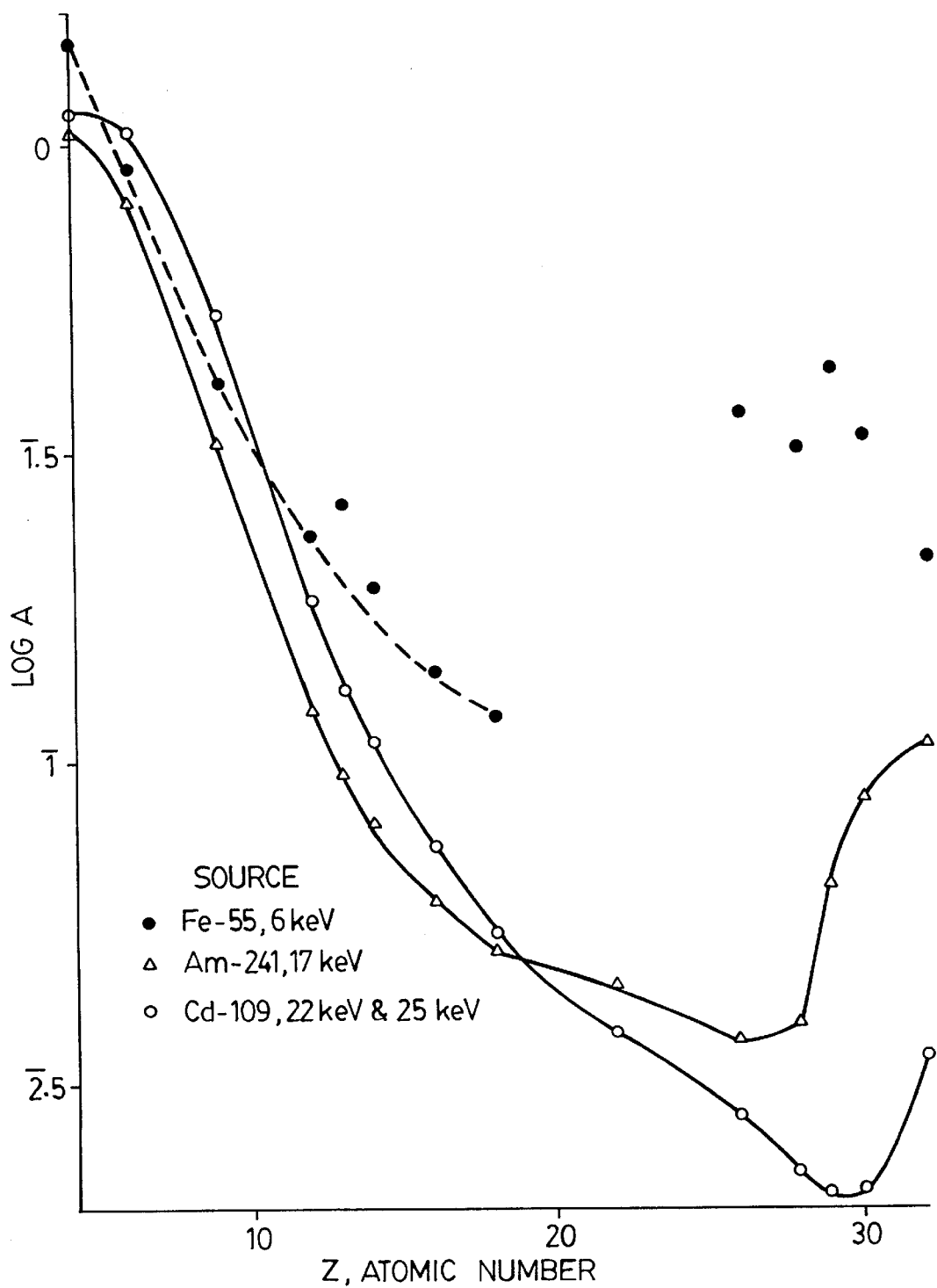
FIG. 4 is a plot of relative x-ray albedos versus x-ray energy and atomic number Z.

FIG. 4 illustrates a plot of relative x-ray albedos versus x-ray energy and atomic number Z which the inventor has discovered is most useful for selecting the best x-ray source for a given task. The best results are obtained for the largest contrast (i.e. ratio of albedos) between the low-Z paint and the backing material. For measuring paint layer thickness on galvanized steel the preferred sources will produce primary photons in the energy range of about 14 keV to about 25 keV with FIG. 4 showing that a $^{109}$Cd source of the Ag K-shell primary photons of energy of 22 keV and 25 keV, is a most preferred source. For measuring the thickness of paint layers on steel panels, these Ag K-shell photons at 22 keV and 25 keV produce better contrast than the $N_pL$ photons from a $^{241}$Am source having an energy of 17 keV, the 14 keV photons from a $^{57}$Co source and substantially better contrast than the soft 6 keV x-rays from $^{55}$Fe.

Figure 5:
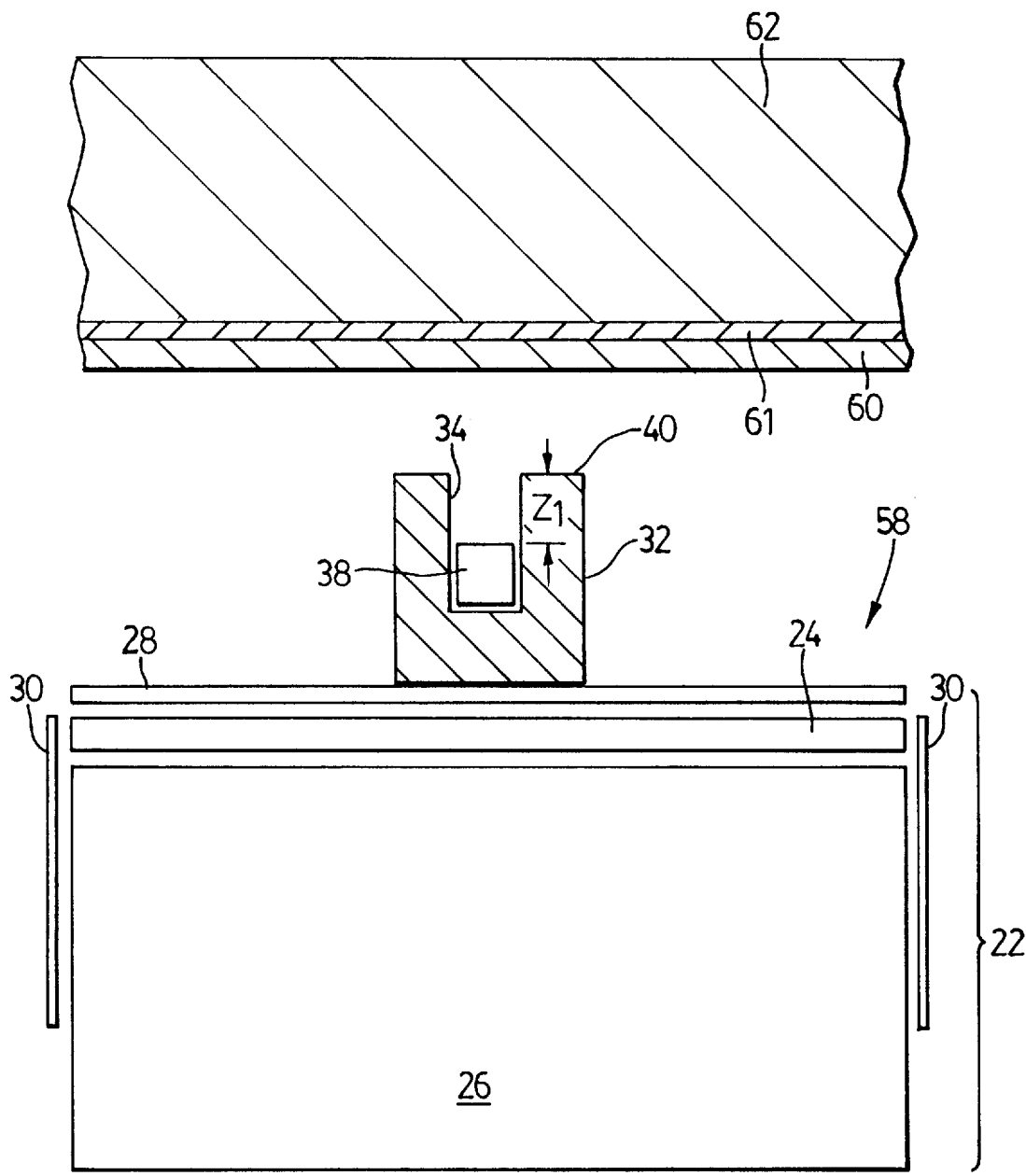
FIG. 5 is a longitudinal section of a probe including radioactive source, holder and detector for measuring thickness of paint layers on substrates according to the present invention.

Referring to FIG. 5, the method for measuring thickness of a paint layer 60 on a substrate 62 involves positioning a probe 58, comprising detector 22 and source holder 32 containing a small x-ray source 38, at a distance of about 1 cm (or further depending on the anticipated sway) from panel 62 and measuring the intensity of the backscattered x-rays. Since paint layer 60 is much thinner than substrate 62 and because it is comprised of elements of low atomic number, the intensity of the x-rays backscattered by the paint will be proportional to the thickness of the paint.

The use of the 22 and 25 keV primary photons from $^{109}$Cd as part of the paint thickness monitoring device is also very advantageous because these photons are attenuated to a much lesser extent by air than the 6 keV photons of $^{55}$Fe. This is particularly problematic on production lines where sideto-side swaying of the vehicle occurs as it moves along the production line so that the probe 58 must be spaced at least 1 cm from the vehicle depending on the amount of sway.

The data for different colored paint layers on steel panels are summarized in Table II at the end of the description which displays the backscattered x-ray intensity from several General Motors panels each painted with a different color. The instrumentation used to obtain the results disclosed herein was produced by Ludlum Measurements Inc. (Sweetwater, Tex., USA) and the radioactive source used was a $^{09}$Cd source of Ag K x-rays (22 and 25 keV) having a strength of about 0.3 millicuries which produces a counting rate on steel panels of only about 500 cps. The last column in Table II was obtained by an ancillary measurement using a clear plastic sheet of thickness 0.10 mm having an areal density of 13.2 mg/cm$^2$ adhered to a bare steel panel. This gave a ratio of 1.406 and served as a calibration for the paint layers.

The results in Table II are noteworthy for two reasons. First, the accuracy is about 2% for the estimate of areal density. Secondly, this required 100 seconds using the weak x-ray source but those skilled in the art will appreciate that it would for example require only 10 seconds with a stronger source of strength of 3 millicuries and only about 1 second with a 30 millicuries source and a fast counting system. As the source strength decreases the precision decreases (roughly as the square root of the inverse source strength). The operative upper limit of the source strength is determined by the counting rate the detection system can tolerate. Use of detectors with high counting efficiency allows weak, non-hazardous sources to be used.

In order to more fully illustrate the effect of substrate composition on backscattering, intensity studies were conducted using a paint coating of 10 mg/cm$^2$ on a) an aluminum panel; b) a steel panel; and c) a zinc panel. The electronic system employed can count at 5,000 counts/sec (cps) and the source strength is chosen to provide that rate. A system for aluminum would use a much weaker source than one for steel, and one for zinc would use a stronger source than for steel. Of the total counts, the fraction, f, contributed by the paint is (a) 0.057 for aluminum, (b) 0.258 for steel and (c) 0.304 for zinc.

If the counting rate is 5,000 cps for a time of t seconds the counts due to the paint is given by:

$$\{5,000t - 5,000(1-f)t\} = 5,000 \ (f)(t)$$

and the % of error in this count is:

$$\frac{100 \times \{5,000t + 5,000(1-f)t\}^{1/2}}{5,000(f)(t)}$$

If it is desirable to measure the intensity to a precision of 5% the counting times are (a) 48 seconds for the aluminum panel, (b) 2.1 seconds for the steel panel and (c) 1.5 seconds for the zinc panel.

To summarize, the background scattering from the panel interferes with the measurement in two ways. It forces the use of a weaker source in order to avoid saturating the counting system and secondly, it introduces statistical errors that force longer counting times to achieve a given precision. The fairly modest goal of 5% precision requires about a minute of counting on Al panels and 1 % precision would require about 25 minutes.

The situation is much better with steel panels. In this case, a precision of 5% is obtained in about 2 seconds of counting and 1% precision in 1 minute. These figures can be reduced by about 30% by using galvanized iron (almost equivalent to zinc) if the time is a critical factor. Therefore, the present method is highly advantageous for assembly line painting of vehicles comprising a substrate of galvanized iron, shown in FIG. 5 as a zinc layer 61 on an ferrous based substrate 62.

If it is desired to use the present counting system near to its design limits then stronger x-ray sources may be employed. Furthermore, the present counting system is an extremely simple, conservative design. It is well within the capabilities of currently available instrumentation to operate at a counting rate of 50,000 cps. Hence, where speed of analysis is essential, such as when the thickness monitoring system forms part of a feedback loop in a system controlling the painting operations, the system is readily adaptable to count at 100 times the rate used in acquiring the data for Table II. In other words, the counts acquired in 100 seconds can be obtained in 1 second. There would be substantially no sacrifice in the accuracy of the data but the highspeed instrumentation could cost several times as much as the low-speed system.

Figure 6:
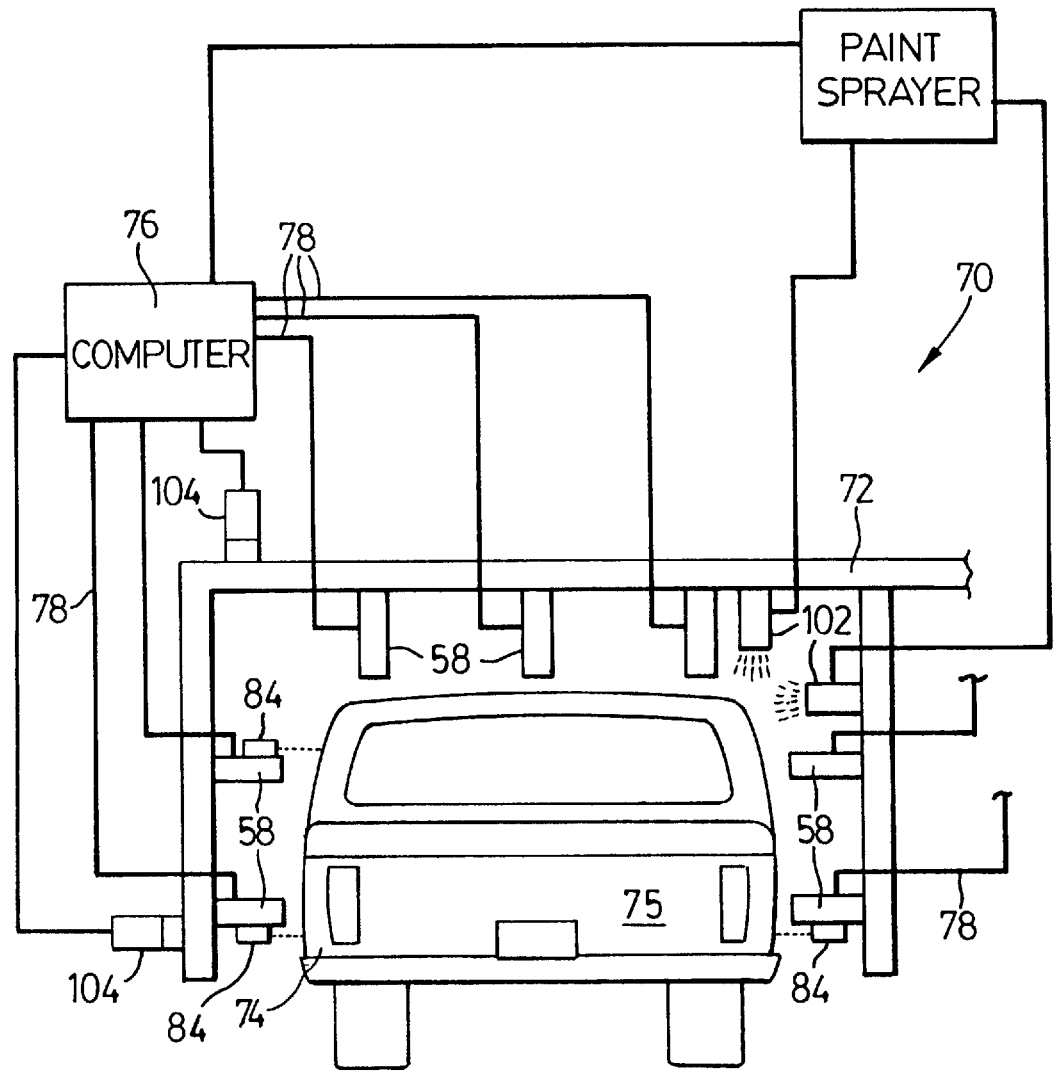
FIG. 6 illustrates the use of a plurality of the probes of FIG. 5 to measure the thickness of paint layers applied to a vehicle on an assembly line.

Referring to FIG. 6, there is shown generally at 70 a plurality of probes 58 mounted on a frame 72 forming part of an assembly line for painting a vehicle 74. A paint dispensing device 100 includes a plurality of paint dispensing heads 102 are mounted on the frame 72 in a vehicle painting bay. The frame 72 is connected to actuators 104 connected to computer 76 for positioning the probes 58 relative to the surface 75 of vehicle 74 being painted. Similarly the paint dispensing devices are under computer control. The output of each probe 58 is input into computer 76 by wires 78 which may be used for monitoring paint thickness during painting so that probes 58 form feedback elements for controlling the painting process. The computer controls the painting process using the thickness determined by the data from probes 58 so that preselected thicknesses of paint are applied to the vehicle. Probes 58 include position sensors 84 for sensing the distance of the probes from the vehicle surface 75.

In order to avoid the problem of the probes being coated by paint during the painting operation they may be disposed along the painting line between painting stations and suitably shielded. Alternatively, the probes could be positioned within the painting stations in retractable, shielded enclosures so that the painting operation can be interrupted and the probes moved into position and unshielded to measure the paint thickness.

The present method may be used to probe paint thickness during the application process before it has dried as well as being used as a probe for the dried paint. If the probe is used as part of a feedback element in a painting process, then a calibration must be used to compensate for evaporation of solvents from the paint after it is applied to the substrate. Paints applied using spraying include a solvent carrier which comprise low-Z elements. The solvent component may exceed 50% of the total volume of the paint mixture. The solvent will also contribute to the backscattered intensity so that each mixture being used would have to be characterized. In other words the x-ray measurement of paint thickness disclosed herein does not distinguish between paint and solvent per se since both are comprised substantially of elements of low atomic number, rather, the method measures the total areal density of matter deposited onto the substrate surface.

More specifically, paints comprise solvents in addition to solids such as pigments and the like and the solvent fraction can be up to 90% for a given paint and may take several hours to fully dry. Therefore, for rapid nondestructive in-situ measurement and control of paint thickness during the coating process requires a thickness measurement of the wet paint layer comprising solvent and solid and not the dried paint comprising only solids. For a paint with a carefully metered original mix of solvent to solids there will be a simple relationship between the solid fraction and the time after applying the paint, for example spraying painting, where the mass fraction is f. The precision of the present paint thickness measurement improves linearly with thickness of the coating, which is in the case of freshly sprayed paint a combination of solvent and solids. If for example one measures the thickness when f=0.5, then the precision is improved by a factor 2 compared to a measurement for the same length of time on fully dried paint.

Conversely, if the measurement is being made with adequate precision, then the counting time may be reduced by a factor of, for example, 4 if the measurement is made at a time when f=0.5. This in turn reduces the uncertainty caused by solvent evaporation that occurs during the measurement time.

Figure 7:
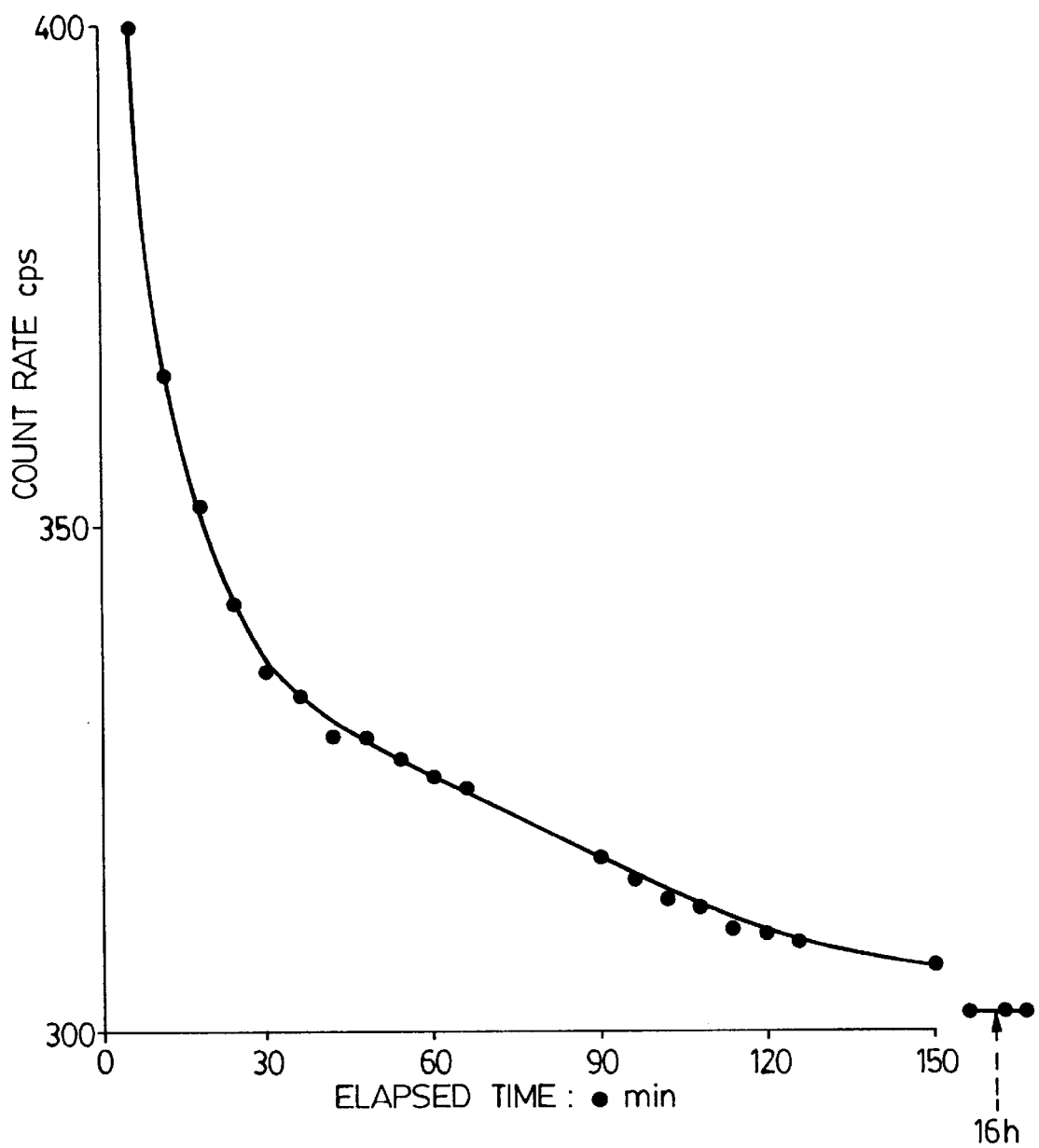
FIG. 7 is a plot illustrating the variation of count rate versus time due to solvent evaporation from the freshly spray painted surface.

FIG. 7 shows the decrease in counting rate versus time after spraying for one particular commercially available spray paint. The initial rate of decay is very rapid and is followed by an approximately linear decay for about 2 hours, corresponding to a linear loss of solvent from the layer. After about 16 hours the readings become very stable suggesting solvent evaporation has substantially ceased. The drying rate (solvent evaporation rate) depends on ambient temperature and air flow over the painted surface. Therefore, in order to use the method for monitoring paint thickness shortly after application to the substrate, the effect on drying rate of composition of the spray paint, ambient temperature, rate of air flow over the substrate and the like is required.

Calibration of evaporation rates as a function of environmental parameters, ratios of solvents to solids for various paints and other relevant calibration information is stored in the computer and is used during the thickness measurement procedure.

The method of measuring paint thickness is most advantageous when the paint is comprised substantially of low-Z atomic elements. However, the method is still advantageous with paints having some high-Z atomic elements present. For example, some paints include titanium dioxide powder. The thickness of these types of paint can be measured using the present technique as long as the impact of the higher atomic element components is accounted for in the calibration procedure.

Referring again to FIGS. 3 and 4, those skilled in the art will appreciate that when Ag K x-rays produced by $^{109}$Cd are used, zinc exhibits the lowest albedo and hence the best contrast. The thickness of paint layers on other substrates such as ungalvanized steel, Fe, Ti, Si and Al and equivalents thereof (that exhibit the necessary contrast) may also be measured using the present method but will exhibit lower contrast than with galvanized steel having a zinc coating so that weaker sources and longer counting times are required.

Figure 8:
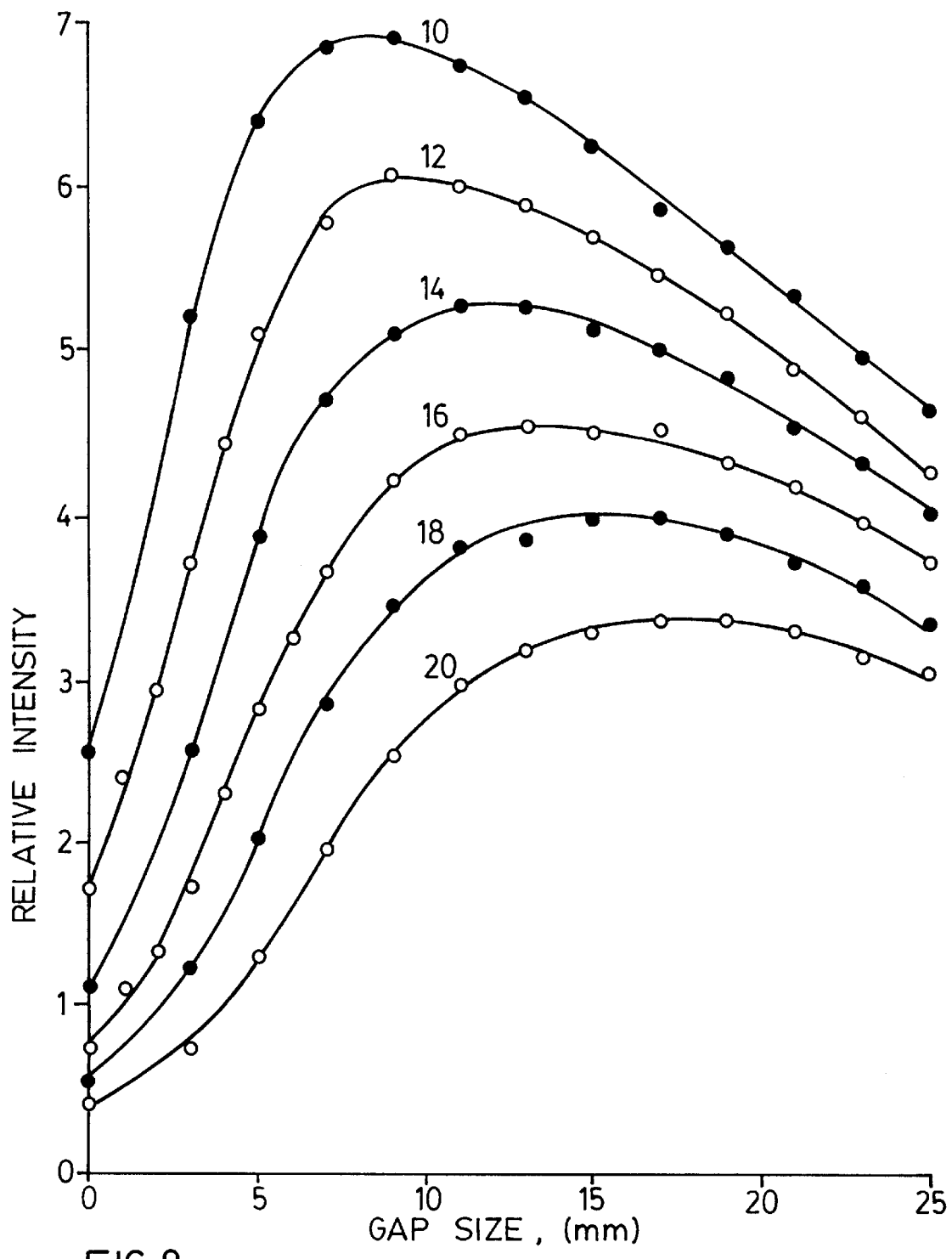
FIG. 8 plots change of intensity of backscattered K X-rays of silver from a polyethylene target as the gap size between source and target is altered, the number of each curve is the diameter in mm of the cylindrical source holder containing the radioactive source.

The present invention advantageously uses shadowing of the source holder to increase the gap between the front of the source holder and the surface being painted. The sway of vehicles on an assembly line necessitates that the probes 58 in FIG. 6 be as far away from the surface of the vehicle as is practicable. FIG. 8 shows the intensity of backscatter from a 6 mm thick polyethylene target for source holders of six different diameters as the gap between the source holder and the target is varied over the range from 0 to 25 mm. The gap size for maximum counting rate, and therefore the optimum gap at which to count a moving target, is observed to move continuously from about 9 mm to about 20 mm as the diameter of the source holder increases from 10 to 20 mm. The sacrifice in total counting rate is about a factor of 2. Shadowing using the source holder is also advantageous in that the effect of air scattering of x-rays is reduced.

The method of measuring thickness of paint layers on metal substrates disclosed herein relies upon 1) the use of shadowing or geometric hindrance to accommodate a larger gap between the source and the painted surface; 2) choice of radioactive source and hence primary photon energy to exploit the use of absorption edges to improve contrast between Compton scattering (desired) and Rayleigh scattering (not desired); 3) optimizing the time after spraying to take advantage of the solvent to increase contrast between the paint and substrate; and 4) collimation of the primary photon beam by varying the position of the source in the source holder.

The method disclosed herein is very advantageous for detecting the presence, and measuring the thickness, of layers on substrates using a simple photodetector and commercially available counting electronics. The thickness of the paint layer may be measured very rapidly with the measurement time dependent on the source strength. While the method has been described with particular reference to measuring thickness of paint coatings, the method may be used for determining thickness of other types of coatings comprising elements of low atomic numbers and so is not limited to measurement of paint thickness alone. In addition, while the preferred embodiments use radioactive sources, other small x-ray sources may be used such as small x-ray tubes and the like.

Therefore, while the present invention has been described and illustrated with respect to the preferred embodiments for measuring the thickness of paint layers on substrates, it will be appreciated that numerous variations of these embodiments may be made depending on the application without departing from the scope of the invention as described herein.

TABLE I

| Energy (keV) | Mass attenuation coefficients (cm$^2$g$^{-1}$) Copper (Z = 29) |
|---|---|
| 6.00 | 131.0 |
| 7.00 | 73.6 |
| 8.00 | 50.3 |
| 8.59 | 40.7 |
| 8.75 | 40.3 |
| 8.83 | 39.5 |
| 8.95 | 306.0 |
| 9.00 | 290.0 |
| 9.12 | 278.0 |
| 9.30 | 262.0 |
| 10.00 | 206.0 |
| 11.00 | 159.0 |
| 13.20 | 98.5 |
| 14.23 | 83.8 |
| 15.40 | 67.6 |
| 16.62 | 53.4 |
| 18.20 | 41.9 |
| 20.39 | 30.5 |
| 22.34 | 24.1 |
| 24.89 | 17.6 |
| 27.99 | 12.8 |
| 34.92 | 6.3 |
| 39.86 | 5.6 |

TABLE II

| PANEL NO. | COLOR | INTENSITY c/100 sec | RATIO w.r.t. bare panel | TOTAL PAINT THICKNESS mg/cm$^2$ |
|---|---|---|---|---|
| 1 | bare | 37,413 | 1.000 | 0 |
| 2 | black | 50,926 | 1.361 | 11.7 ± .08 |
| 3 | white | 53,823 | 1.439 | 14.3 ± .021 |
| 4 | maroon | 50,403 | 1.347 | 11.3 ± .018 |
| 5 | red | 53,905 | 1.441 | 14.3 ± .021 |
| 6 | sandy | 50,608 | 1.353 | 11.5 ± .018 |

Therefore what is claimed is:

1. A method for measuring thickness of a coating comprising elements of low atomic numbers such as, but not limited to paint formed on a surface of a metal substrate such as aluminum, titanium, iron, galvanized iron, copper, and alloys and equivalents thereof, the method comprising the steps of:

providing a radioactive source in a source holder, the radioactive source being selected to produce primary photons having energies in the range from about 14 keV to about 25 keV, sufficiently high so that Compton scattering from the paint coating is enhanced over Compton and Rayleigh scattering from the metal substrate but low enough to contrast between photoelectric absorption in the paint coating and the metal substrate;

positioning said source holder in opposing relation to a surface of a paint- coated metal substrate and measuring a total intensity of backscattered secondary photons from the paint-coated metal substrate; and determining the thickness of the paint coating from the total intensity of backscattered photons.

2. The method according to claim 1 wherein the step of providing a radioactive source in a source holder includes providing a cylindrically symmetric source holder to provide an axially symmetric beam of primary photons emerging from said source holder.

3. The method according to claim 2 wherein the radioactive source is selected from the group consisting of $^{57}$Co, $^{241}$Am and $^{109}$Cd sources, said radioactive source having a source strength in the range from about 0.3 millicuries to about 30 millicuries.

4. The method according to claim 3 wherein the step of measuring total intensity of backscattered secondary photons includes measuring said intensity with a NaI(Tl) X-ray scintillator coupled with a photomultiplier detector.

5. The method according to claim 4 including adjusting the position of the radioactive source in the source holder to control collimation of the beam of primary photons.

6. A method for controlled application of paint to a surface of a metal substrate such as aluminum and its alloys, titanium and its alloys, iron and iron alloys including galvanized iron, copper and its alloys, and equivalents thereof, the method comprising the steps of:

a) providing an x-ray source in a source holder, the x-ray source being selected to produce primary photons having energies in the range from about 14 keV to about 25 keV, sufficiently high to provide dominance of Compton scattering from the paint coating over Compton and Rayleigh scattering from the metal substrate but low enough to provide sufficient contrast between photoelectric absorption in the paint coating and the metal substrate;

b) applying paint to said surface and positioning said holder in opposing relation to the surface of the metal substrate being painted and measuring a total intensity of backscattered secondary photons from the paint-coated metal substrate; and c) processing said intensity of backscattered secondary photons and calculating therefrom a thickness of the paint coating, comparing said thickness to a preselected paint thickness and if the thickness of the paint coating is less than said preselected paint thickness repeat step b) otherwise terminate applying paint to said surface.

7. The method according to claim 6 wherein the step of providing an x-ray source in a source holder includes providing a cylindrically symmetric source holder to provide an axially symmetric beam of primary photons emerging from said source holder.

8. The method according to claim 7 wherein the x-ray source is a radioactive source selected from the group consisting of $^{57}$Co, $^{241}$Am and $^{109}$Cd sources, said radioactive source having a source strength in the range from about 0.3 millicuries to about 30 millicuries.

9. The method according to claim 8 wherein the step of measuring total intensity of backscattered secondary photons includes measuring said intensity with a NaI(Tl) X-ray scintillator coupled with a photomultiplier detector.

10. The method according to claim 7 wherein the step of providing a radioactive source in a source holder includes adjusting the position of the radioactive source in the source holder to control collimation of the beam of primary photons.

11. An apparatus for controlling application of a paint coating to a metal surface of a vehicle, comprising:
   a) a plurality of probes mounted on a frame, each probe including an xray source located in a source holder and a photodetection means located behind each source holder for measuring an intensity of backscattered photons, the x-ray source being selected to produce primary photons having energies in the range from about 14 keV to about 25 keV high enough to provide dominance of Compton scattering from the paint coating over Compton and Rayleigh scattering from the metal substrate but low enough to provide effective contrast between photoelectric absorption in the paint coating and the metal substrate; and
   b) a painting device for dispensing paint and computer control means connected to said painting device and said probes wherein each probe forms a feedback element for computer control of the amount of paint discharged by said painting device.

12. The apparatus according to claim 11 wherein said source holder is a cylindrically symmetric source holder mounted in front of said photodetection means to provide an axially symmetric beam of primary photons emerging from said source holder away from said photodetection means.

13. The apparatus according to claim 11 including actuator means connected to said computer for positioning said probes a preselected distance from said vehicle surface so that the beam of primary photons from said source holders are directed toward the vehicle surface being painted and backscattered photons intercept said photodetection means.

14. The apparatus according to claim 12 wherein the x-ray source is a radioactive source selected from the group consisting of $^{57}$Co, $^{241}$Am and $^{109}$Cd sources, said radioactive source having a source strength in the range from about 0.3 millicuries to about 30 millicuries.

15. The apparatus according to claim 14 wherein said photodetection means includes a NaI(Tl) X-ray scintillator.

16. The apparatus according to claim 15 wherein said photodetection means includes a photomultiplier detector coupled with said NaI(Tl) X-ray scintillator.

17. The apparatus according to claim 12 wherein the source holder includes adjustment means for adjusting the position of the x-ray source in the source holder to control collimation of the beam of primary photons.

18. The apparatus according to claim 11 wherein the paint is comprised substantially, but not exclusively, of atomic elements having atomic numbers less than the atomic numbers of the elements forming the vehicle substrate.

19. The apparatus according to claim 16 including actuator means connected to said probes and said computer for positioning said probes a preselected distance from said vehicle surface so that the beam of primary photons from said source holders are directed toward the vehicle surface being painted and backscattered photons intercept said photodetection means.

* * * * *

UNITED STATES PATENT AND TRADEMARK OFFICE
CERTIFICATE OF CORRECTION

PATENT NO. : 5,862,199

Page 1 of 2

DATED : January 19, 1999

INVENTOR(S) : Innes K. MacKenzie

It is certified that error appears in the above-identified patent and that said Letters Patent is hereby corrected as shown below:

Column 2, line 39, before the word "range", insert --broad--;

Column 3, line 60, the chemical formula "NaI(TI)" should read --NaI(Tl)--;

Column 4, line 52, delete "NaI(TI)" and insert --NaI(Tl)--;

Column 12, line 31, delete "NaI(TI)" and insert --NaI(Tl)--;

Column 13, line 6, delete "NaI(TI)" and insert --NaI(Tl)--;

Column 14, lines 15 and 18, delete "NaI(TI)" and insert --NaI(Tl)--;

Column 7, line 21, "1140th" should read --1/40th--;

Column 7, line 55, the term "sideto-side" should read --side-to-side--;

Column 7, last line, "$^{05}$Cd" should read --$^{109}$Cd--;

Column 8, line 53, "A1" should read --Al--;

UNITED STATES PATENT AND TRADEMARK OFFICE
CERTIFICATE OF CORRECTION

PATENT NO. : 5,862,199
DATED     : January 19, 1999
INVENTOR(S) : Innes K. MacKenzie It is certified that error appears in the above-identified patent and that said Letters Patent is hereby corrected as shown below:

Claim 1, line 11, col. 12, before the word "contrast", insert --provide--;

Signed and Sealed this

Eleventh Day of January, 2000

Attest:

Attesting Officer

Q. TODD DICKINSON

Acting Commissioner of Patents and Trademarks